(12) United States Patent
Jung et al.

(10) Patent No.: US 12,233,843 B2
(45) Date of Patent: *Feb. 25, 2025

(54) METHOD FOR AUTOMATICALLY CONTROLLING IN-CABIN ENVIRONMENT FOR PASSENGER AND SYSTEM THEREFOR

(71) Applicant: HYUNDAI MOBIS CO., LTD., Seoul (KR)

(72) Inventors: Yu Jin Jung, Seoul (KR); Sung Sik Cho, Yongin-si (KR); Yeong Hun Park, Seoul (KR)

(73) Assignee: Hyundai Mobis Co., Ltd., Seoul (KR)

( * ) Notice: Subject to any disclaimer, the term of this patent is extended or adjusted under 35 U.S.C. 154(b) by 286 days.

This patent is subject to a terminal disclaimer.

(21) Appl. No.: 17/879,331

(22) Filed: Aug. 2, 2022

(65) Prior Publication Data
US 2023/0135942 A1    May 4, 2023

(30) Foreign Application Priority Data

Nov. 3, 2021  (KR) .................. 10-2021-0149396
Nov. 3, 2021  (KR) .................. 10-2021-0149397

(51) Int. Cl.
*B60W 10/30*  (2006.01)
*B60H 1/00*   (2006.01)
(Continued)

(52) U.S. Cl.
CPC ......... *B60W 10/30* (2013.01); *B60H 1/00742* (2013.01); *B60J 3/04* (2013.01);
(Continued)

(58) Field of Classification Search
CPC ........... B60W 10/30; B60W 60/00133; B60W 2420/40; B60W 2420/403;
(Continued)

(56) References Cited

U.S. PATENT DOCUMENTS 11,351,892 B1    6/2022 Roy
2015/0335507 A1  11/2015 Emmons et al.
(Continued)

FOREIGN PATENT DOCUMENTS

KR   10-1999-0059460 A    7/1999
WO   WO 2018/151901 A1    8/2018
(Continued)

OTHER PUBLICATIONS

Extended European Search Report Issued on Mar. 21, 2023, in Counterpart European Patent Application No. 22190494.9 (7 Pages in English).
(Continued)

*Primary Examiner* — Calvin Cheung
(74) *Attorney, Agent, or Firm* — NSIP Law

(57) ABSTRACT

A method for automatically controlling an in-cabin environment for a passenger in an autonomous vehicle includes monitoring a state of the passenger via a video sensor; determining whether the state of the passenger corresponds to one of preset states of a predetermined number; and adjusting, when the state corresponds to the one of the preset states, any one or any combination of any two or more of a seat, an air conditioning system, a lighting system, a sound system, a variable window tinting, and a variable sunroof of the autonomous vehicle based on the state. The determining of the state of the passenger includes detecting a plurality of determination target objects from a video of the video sensor, cropping an image of each of the plurality of determination target objects, and determining whether the state of the passenger corresponds to the one of the preset states.

16 Claims, 17 Drawing Sheets

(51) Int. Cl.
  *B60J 3/04* (2006.01)
  *B60N 2/02* (2006.01)
  *G06V 10/26* (2022.01)
  *G06V 10/82* (2022.01)
  *G06V 20/59* (2022.01)
  *G06V 40/10* (2022.01)
  *G06V 40/16* (2022.01)
  *B60W 60/00* (2020.01)

(52) U.S. Cl.
  CPC ............ *B60N 2/0244* (2013.01); *G06V 10/26* (2022.01); *G06V 10/82* (2022.01); *G06V 20/597* (2022.01); *G06V 40/103* (2022.01); *G06V 40/168* (2022.01); *B60W 60/00133* (2020.02); *B60W 2420/40* (2013.01); *B60W 2420/403* (2013.01); *B60W 2420/54* (2013.01); *B60W 2540/043* (2020.02); *B60W 2540/049* (2020.02); *B60W 2540/221* (2020.02); *B60W 2540/225* (2020.02); *B60W 2540/229* (2020.02); *G06V 2201/07* (2022.01)

(58) Field of Classification Search
  CPC ....... B60W 2420/54; B60W 2540/043; B60W 2540/049; B60W 2540/221; B60W 2540/225; B60W 2540/229; B60H 1/00742; B60J 3/04; B60N 2/0244; G06V 10/26; G06V 10/82; G06V 20/597; G06V 40/103; G06V 40/168; G06V 2201/07
  See application file for complete search history.

(56) References Cited

U.S. PATENT DOCUMENTS

| | | |
|---|---|---|
| 2017/0278313 A1 | 9/2017 | Maslar et al. |
| 2019/0005412 A1 | 1/2019 | Matus et al. |
| 2019/0059589 A1 | 2/2019 | Zhang |
| 2020/0062275 A1 | 2/2020 | Higgins et al. |
| 2020/0065596 A1 | 2/2020 | Maeng et al. |
| 2020/0231109 A1* | 7/2020 | Baltaxe .................. G06N 3/08 |

FOREIGN PATENT DOCUMENTS

| | | |
|---|---|---|
| WO | WO 2020/006154 A2 | 1/2020 |
| WO | WO 2020/118273 A2 | 6/2020 |
| WO | WO 2020/118273 A9 | 6/2020 |

OTHER PUBLICATIONS

U.S. Office Action issued on Jul. 16, 2024, in related U.S. Appl. No. 18/454,892 (11 pages).

U.S. Office Action issued on Oct. 29, 2024, in related U.S. Appl. No. 18/454,892 (7 pages).

* cited by examiner

- SEAT SENSOR
- VIDEO SENSOR (INTERNAL CAMERA)(111)
- ILLUMINANCE SENSOR (113)
- BIOMETRIC SENSOR (OLFACTORY SENSOR) (112)
- MICROPHONE (114)

METHOD FOR AUTOMATICALLY CONTROLLING IN-CABIN ENVIRONMENT FOR PASSENGER AND SYSTEM THEREFOR

CROSS-REFERENCE TO RELATED APPLICATIONS

This application claims the benefit under 35 U.S.C. § 119(a) of Korean Patent Application Nos. 10-2021-0149396, and 10-2021-0149397, both filed on Nov. 3, 2021, the entire disclosures of which are incorporated herein by reference for all purposes.

BACKGROUND

Field

The present disclosure relates to a method for automatically controlling an in-cabin environment for a passenger and a system therefor. Specifically, one aspect of the present disclosure relates to a method for recognizing a state of a passenger of an autonomous vehicle via a video sensor to automatically control an in-cabin environment in the corresponding vehicle, and a system therefor. In addition, another aspect of the present disclosure relates to a method for sensing whether a passenger is drowsing or sleeping, and when it is determined that the passenger is in the drowsing or sleeping state, controlling such that a mode of at least one of a seat, an air conditioning system, a lighting system, a sound system, variable window tinting, and a variable sunroof of a mobility device is switched to a sleep mode, and a device therefor.

Discussion of the Related Art

With advent of an autonomous driving era, an environment in which a passenger, especially a driver, may sleep/rest more comfortably while traveling and perform a task within a vehicle has been created. In other words, an autonomous vehicle is not only used as simple means of transportation, but is interpreted as a third space where various activities such as the rest, the task, entertainment, and the like are conducted.

In line with such autonomous driving era, various previous studies for the comfortable sleep/rest/task performance of the passenger have been made. However, such previous studies are focused on a scheme for the passenger to adjust an in-cabin environment in the vehicle in a convenient manner to suit a situation thereof.

In addition, Korean Patent Publication Application No. 10-2016-0096766 (filed on Jul. 29, 2016) discloses provision of an environment suitable for a state of the passenger by utilizing a wearable device worn by the passenger to determine the state of the passenger. However, the state of the passenger that may be identified via such wearable device may be limited, and the passenger has to bear inconvenience of having to wear the separate wearable device.

With the advent of the autonomous driving era, the environment in which the passenger, especially the driver, may sleep/rest more comfortably while traveling has been created.

Accordingly, International Patent Publication Application No. WO2016010313A3, as a vehicle sleep safety device, proposes a technology of maintaining an amount of oxygen via inflow of outside air when the amount of indoor oxygen measured by an oxygen sensor in the vehicle decreases.

In addition, International Patent Publication Application No. WO2017094993A1, as a system and a method for providing a health care service including a smart air mattress, proposes a technology of providing health care by adjusting an air pressure, a temperature, and a humidity of the mattress.

However, the prior art as described above is not able to automatically determine the sleeping state of the passenger and take action in the vehicle, and there is a limit in that a user has to directly adjust lighting, sound, a seat position, or the like in order to take a comfortable sleep. That is, the prior art does not provide a part of efficiently providing a sleep mode of the vehicle by automatically determining whether the passenger is drowsing or sleeping.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method for automatically controlling an in-cabin environment for a passenger in an autonomous vehicle includes monitoring a state of the passenger via a video sensor; determining whether the state of the passenger corresponds to one of preset states of a predetermined number; and adjusting, when the state corresponds to the one of the preset states, any one or any combination of any two or more of a seat, an air conditioning system, a lighting system, a sound system, a variable window tinting, and a variable sunroof of the autonomous vehicle based on the state. The determining of the state of the passenger includes detecting a plurality of determination target objects from a video of the video sensor, cropping an image of each of the plurality of determination target objects, and determining whether the state of the passenger corresponds to the one of the preset states via combinations of feature vectors of each of the cropped images.

The monitoring of the state of the passenger may include individually monitoring states of a plurality of passengers.

The determining of the state of the passenger may further include determining, when the states of the plurality of passengers are individually monitored, whether independent states of the plurality of passengers correspond to the one of the preset states; and determining whether the independent states of the plurality of passengers correspond to a common group state.

The images of the plurality of determination target objects may include any one or any combination of any two or more of an image of either one or both of a specific part of a face and joints of the passenger, an image related to a gaze direction of the passenger, an image about an identity of the passenger, and an image of belongings of the passenger.

The method may further include an auxiliary sensor including any one or any combination of any two or more of a biometric sensor configured to recognize a bio-signal of the passenger, an illuminance sensor configured to sense illuminance in the autonomous vehicle, and a microphone.

The determining of the state of the passenger may further include using information based on the auxiliary sensor.

The method may further include controlling a mode of any one or any combination of any two or more of the seat, the air conditioning system, the lighting system, the sound system, the variable window tinting, and the variable sunroof to a sleep mode when it is determined that the state of the passenger is a drowsy or sleepy state. The drowsing or the sleeping state of the passenger is determined by the video sensor based on states of a face and joints of the passenger.

The video sensor may determine features of the face and the joints of the passenger based on a convolutional neural network (CNN) scheme. The videos of the features of the face and the joints of the passenger may include a video of any one or any combination of any two or more of eyes, a mouth, a head, and knees of the passenger.

In another general aspect, a system for an autonomous vehicle for automatically controlling an in-cabin environment for a passenger includes a video sensor configured to monitor a state of the passenger; and a processor. The processor is configured to, when the state of the passenger corresponds to one of preset states of the predetermined number, adjust any one or any combination of any two or more of a seat, an air conditioning system, a lighting system, a sound system, a variable window tinting, and a variable sunroof of the autonomous vehicle based on the corresponding state; detect a plurality of determination target objects from a video of the video sensor; crop an image of each of the plurality of determination target objects; and determine whether the state of the passenger corresponds to the one of the preset states via combinations of feature vectors of each of the cropped images.

The video sensor may individually monitor states of a plurality of passengers.

The processor may further be configured to determine whether independent states of the plurality of passengers correspond to the one of the preset states, and determine whether the independent states correspond to a common group state.

The images of the plurality of determination target objects may include any one or any combination of any two or more of an image of either one or both of a specific part of a face and joints of the passenger, an image related to a gaze direction of the passenger, an image about an identity of the passenger, and an image of belongings of the passenger.

The system may further include an auxiliary sensor including any one or any combination of any two or more of a biometric sensor configured to recognize a bio-signal of the passenger, an illuminance sensor configured to sense illuminance in the autonomous vehicle, and a microphone.

The processor may further be configured to further determine the state of the passenger using information based on the auxiliary sensor.

The processor may further be configured to control a mode of any one or any combination of any two or more of the seat, the air conditioning system, the lighting system, the sound system, the variable window tinting, and the variable sunroof to a sleep mode when it is determined that the state of the passenger is a drowsy or sleepy state; and determine the drowsing or the sleeping state of the passenger based on states of a face and joints of the passenger.

The system may further include a memory configured to store instructions. The processor may further be configured to execute the instructions to configure the processor to detect the plurality of determination target objects, crop the image of the plurality of determination target objects, and determine whether the state of the passenger corresponds to the one of the preset states.

Other features and aspects will be apparent from the following detailed description, the drawings, and the claims.

BRIEF DESCRIPTION OF THE DRAWINGS

Throughout the drawings and the detailed description, the same reference numerals refer to the same or like elements. The drawings may not be to scale, and the relative size, proportions, and depiction of elements in the drawings may be exaggerated for clarity, illustration, and convenience.

DETAILED DESCRIPTION

Figure 1:
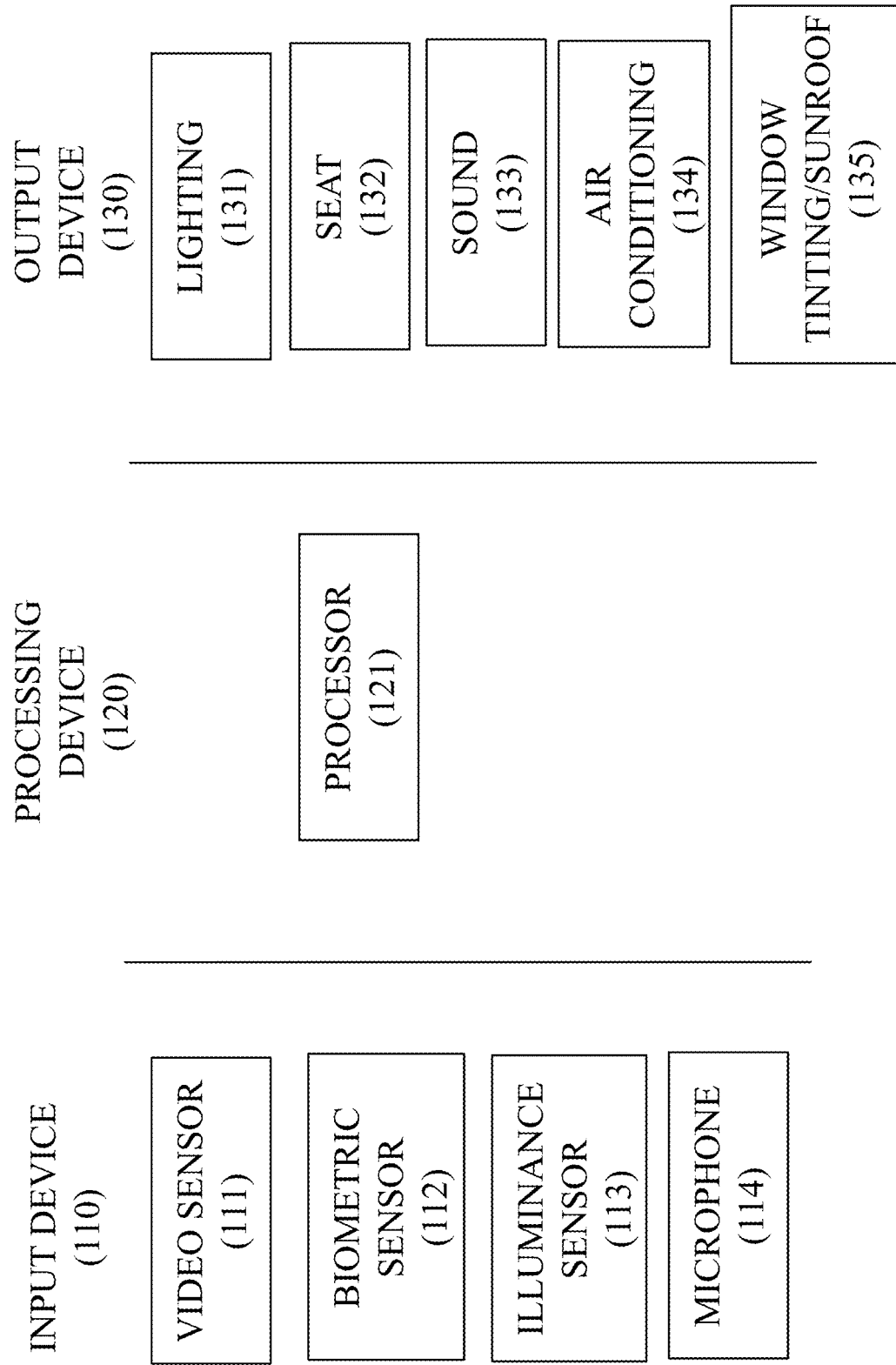
FIGS. 1 and 2 are diagrams for illustrating a system configuration for performing automatic in-cabin environment control for a passenger according to an embodiment of the present disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

In a following description, a term 'mobility device' is a concept that includes a special vehicle such as a traditional passenger car, a van, and the like. Unless there are other specific restrictions, it is assumed that the term 'mobility device' is an all-inclusive concept including not only such traditional vehicles, but also a robot, a bike, and the like that may provide mobility to a passenger. In addition, even in a case of an example in which the 'mobility device' is referred to as a 'vehicle' for convenience of description in the following description, the 'vehicle' means a concept encompassing the aforementioned 'mobility device' unless otherwise specified.

Figure 2:
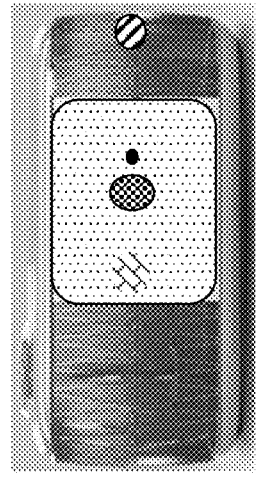

FIGS. 1 and 2 are diagrams for illustrating a system configuration for performing automatic in-cabin environment control for a passenger according to an embodiment of the present disclosure.

First, as shown in FIG. 1, an in-cabin environment control system according to the present embodiment may be described by being divided into an input device 110 used to identify/determine a state of the passenger, a processing device 120 for controlling an output device 130 based on information obtained by the input device 110, and the output device 130 that controls various in-cabin environments in the mobility device under the control of the processing device 120.

In one embodiment of the present disclosure, it is proposed to utilize a video sensor 111 among components of the input device 110 described above to monitor the state of the passenger. Although a development of an artificial intelligence (AI) technology is being made in various fields, in particular, a technology for video recognition is developing rapidly in recent years. In particular, via feature extraction and pooling processes using a convolutional neural network (CNN), an accuracy of the video recognition was able to be increased compared to an existing scheme in which a user sets a feature. A method for utilizing the above-described technology in the determination of the state of the passenger of the present embodiment will be described later in more detail with reference to FIG. 3 below.

In one example, the video sensor 111 may be an internal camera 111 that is positioned at an upper portion of a front face of the vehicle as shown in FIG. 2 and is disposed at a location capable of identifying states of a single or a plurality of passengers, but the locations and the number of such video sensors 111 need not be particularly limited. In addition, such video sensor 111 may be used not only to recognize a motion of the passenger and an object possessed by the passenger, but also to identify biometric information such as a body temperature, a heart rate, and the like.

Based on the passenger monitoring of the video sensor 111 as described above, the processing device 120 may be configured to determine whether the state of the passenger corresponds to one of preset states of the predetermined number via a processor 121, and when the state of the passenger corresponds to one of the preset states, adjust lighting 131, a seat 132, sound 133, air conditioning 134, and a variable window tinting/sunroof 135 of an autonomous vehicle based on the corresponding state.

In one example, as shown in FIGS. 1 and 2, the automatic in-cabin environment control system according to an embodiment of the present disclosure may additionally include, as auxiliary sensing means (sensor), at least one of a biometric sensor 112 for recognizing a bio-signal of the passenger, an illuminance sensor 113 for sensing illuminance in the autonomous vehicle, and a microphone 114. Information of the passenger identified by such auxiliary sensing means may be utilized as auxiliary means for the determination of the state of the passenger based on video information obtained by the video sensor 111 to increase the accuracy of the video recognition.

Figure 3:
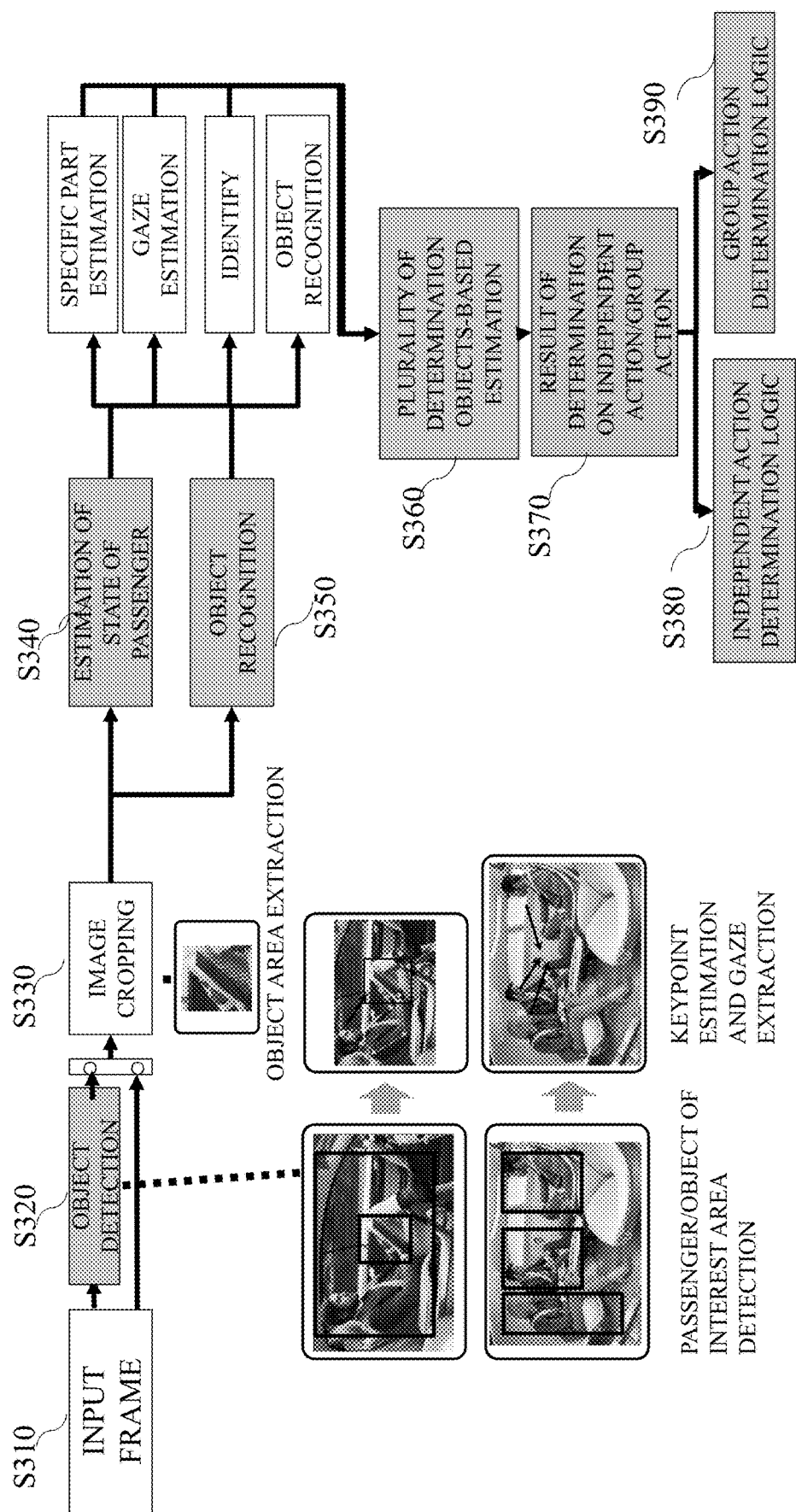
FIG. 3 is a diagram for illustrating a method for determining a state of a passenger via a video of the passenger according to an embodiment of the present disclosure.

FIG. 3 is a diagram for illustrating a method for determining a state of a passenger via a video of the passenger according to an embodiment of the present disclosure.

First, the video filmed by the video sensor described above in FIGS. 1 and 2 may be input as an input frame of FIG. 3 (S310). The processor according to the present embodiment proposes to detect a plurality of determination target objects with respect to the input frame input as such (S320). In this regard, the plurality of determination target object images may include at least one of an image about at least one specific body part of a face and joints of the passenger (keypoint information), an image related to a gaze direction of the passenger (gaze information), an image about a passenger identity, and an image about an object of the passenger.

In addition, as shown in FIG. 3, such a plurality of determination target object images may be detected for one passenger, and as shown at a bottom, may be set to be acquired for each of the plurality of passengers.

When the plurality of determination target objects are detected as described above, cropping may be performed on each determination target object image (S330). This is to perform a subsequent CNN-based deep learning process by making the plurality of determination target object images independent of each other.

Estimation of the state of the passenger (S340) and object recognition (S350) may be performed for each of the images cropped as such. For this, CNN-based RCNN, Fast CNN, Faster CNN, and the like may be utilized but the present disclosure may not be limited thereto. Specifically, via a combination of feature vectors of each cropped image, whether the state of the passenger corresponds to one of the preset states (e.g., reading, sleeping, business meeting, and the like) of the predetermined number may be determined (S360). Such an operation may be performed via software of the processor or collaboration with a server to be connected to the processor.

In one example, as shown in FIG. 3, in one embodiment of the present disclosure, a determination on an independent action of one passenger and a determination on a group action of the plurality of passengers may be performed (S370). That is, when it is determined that the plurality of passengers are performing the group action, in-cabin environment control corresponding thereto may be performed (S390). However, when it is not able to be determined that the plurality of passengers are performing the group action, the in-cabin environment control may be performed corresponding to the independent action of one passenger (S380).

Figure 4:
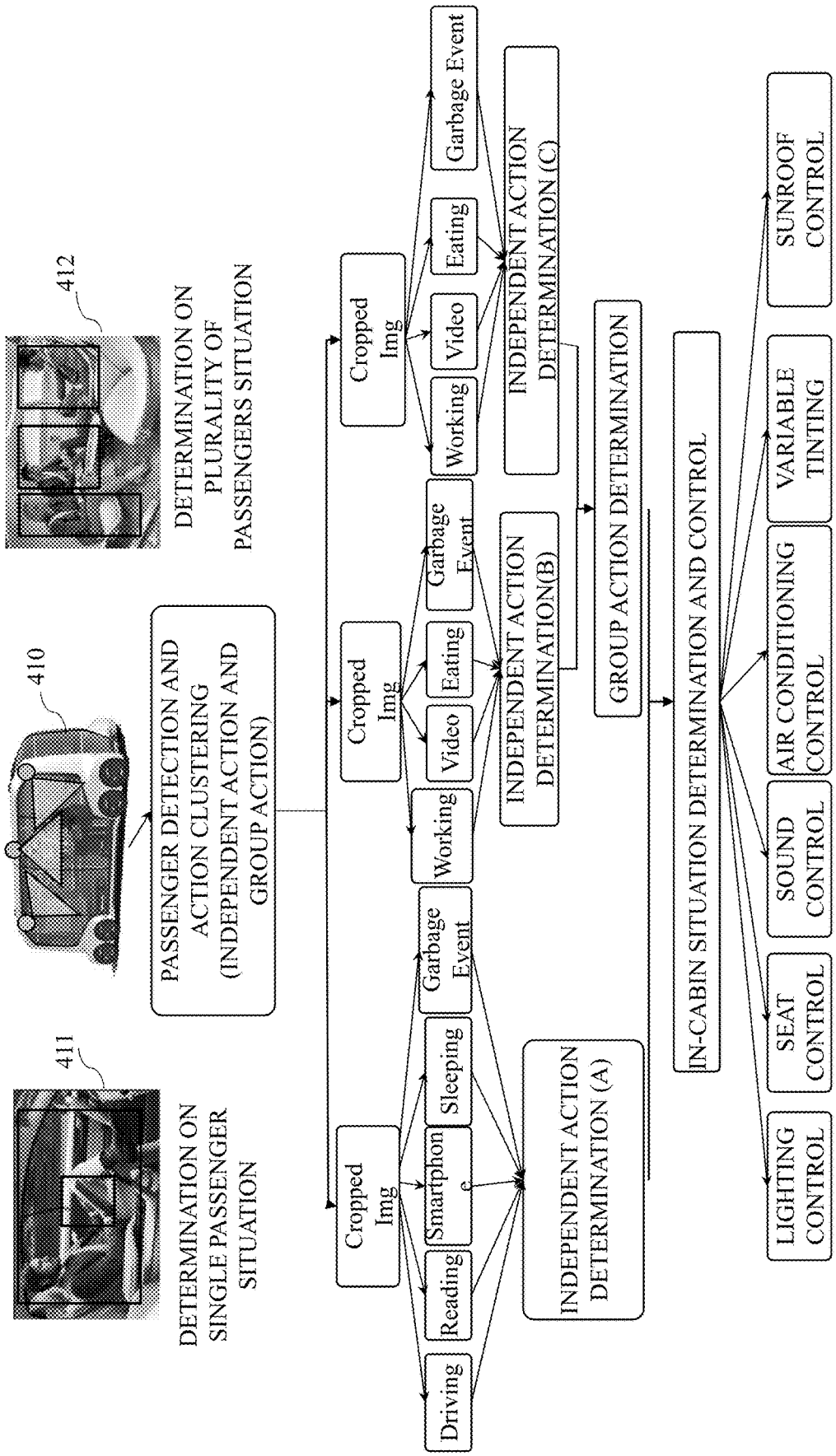
FIG. 4 is a diagram for illustrating an in-cabin environment control scheme based on states of a single or a plurality of passengers according to an embodiment of the present disclosure.

FIG. 4 is a diagram for illustrating an in-cabin environment control scheme based on states of a single or a plurality of passengers according to an embodiment of the present disclosure.

First, as shown in reference numeral 410 in FIG. 4, there are cases in which the plurality of passengers ride the autonomous vehicle such as a bus as well as the passenger car. When there are the plurality of passengers, it is desirable to consider both of a determination 411 on a single passenger situation and a determination 412 on a group situation of the plurality of passengers.

In one embodiment of the present disclosure, first, it is proposed to determine whether the single passenger situation corresponds to one of predetermined states for each passenger. For example, as shown in FIG. 4, it may be determined whether the result of the determination on the plurality of determination target objects for each passenger corresponds to one of driving, reading, using a smartphone, sleeping, and business meeting. In addition, for efficiency of the operation, it is desirable to set a state (a garbage event) for a case in which the state of each passenger is not able to be determined as a state having a special meaning during the state determination for each passenger.

As described above, when it is determined that all passengers are in a state corresponding to task/meeting as the result of the determination on the state of each passenger, the processor according to the present embodiment may determine that the passengers are performing the business meeting as the group action. Accordingly, the processor may perform the in-cabin environment, such as brightly adjusting the lighting, moving the seats in a direction facing each other, and blocking external sound.

However, in one embodiment of the present disclosure, the above-mentioned 'group state' is not limited to cases in which all of the passengers are doing a common action/in a common state. When it is determined that people of the predetermined number are in the common 'group state', it is proposed to create an in-cabin environment suitable for such group state. For example, as shown in FIG. 3, it may be determined that, among the plurality of passengers, a driver is in the 'driving' state, and the remaining passengers are in the 'task/meeting' state. In this case, the system according to the present embodiment may determine a group state corresponding to the 'task/meeting' and create the in-cabin environment accordingly. The system according to the present embodiment may adjust the lighting so as not to be too bright such that the driving of the driver is not interfered.

Figure 5:
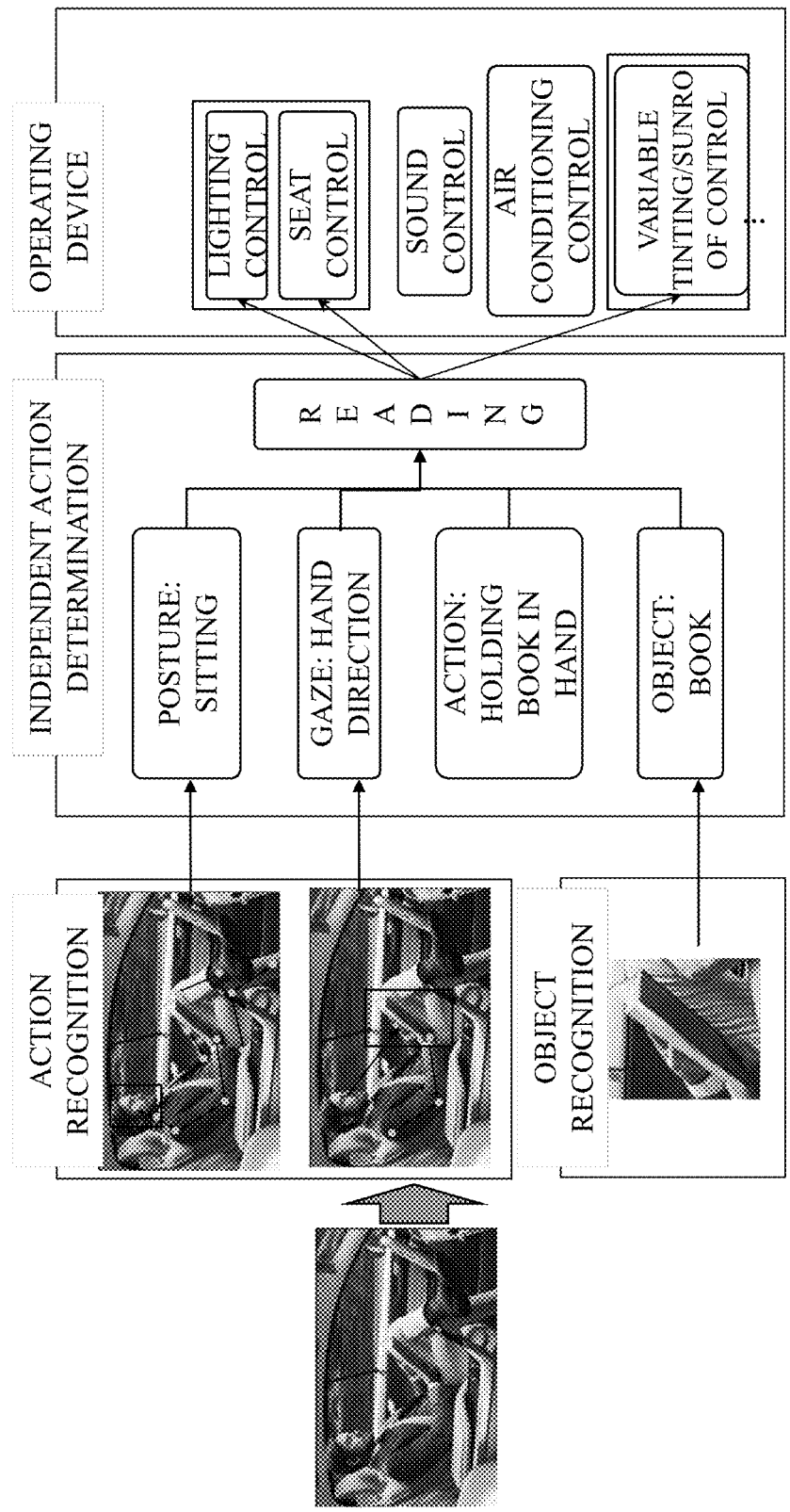
FIG. 5 is a diagram for illustrating an example of creating an in-cabin environment when a passenger is reading according to an embodiment of the present disclosure.

FIG. 5 is a diagram for illustrating an example of creating an in-cabin environment when a passenger is reading according to an embodiment of the present disclosure.

First, the video sensor may recognize a video of the passenger and the object possessed by the passenger in the scheme described above in relation to FIG. 3. An example in FIG. 5 illustrates a case in which a posture (sitting), a gaze (looking at a direction of a hand), and the action (holding a book in the hand) of the passenger are determined as the plurality of determination target objects and the object possessed by the passenger is recognized as the book.

The 'reading' may be determined as the independent action of the passenger based on the determination on the determination target objects as described above, and the in-cabin environment control may be performed accordingly. Specifically, in FIG. 5, the lighting may be brightly adjusted, the seat may be reclined as a relaxation mode, and the variable window tinting/sunroof may be adjusted to prevent glare of the passenger by blocking external light.

Figure 6:
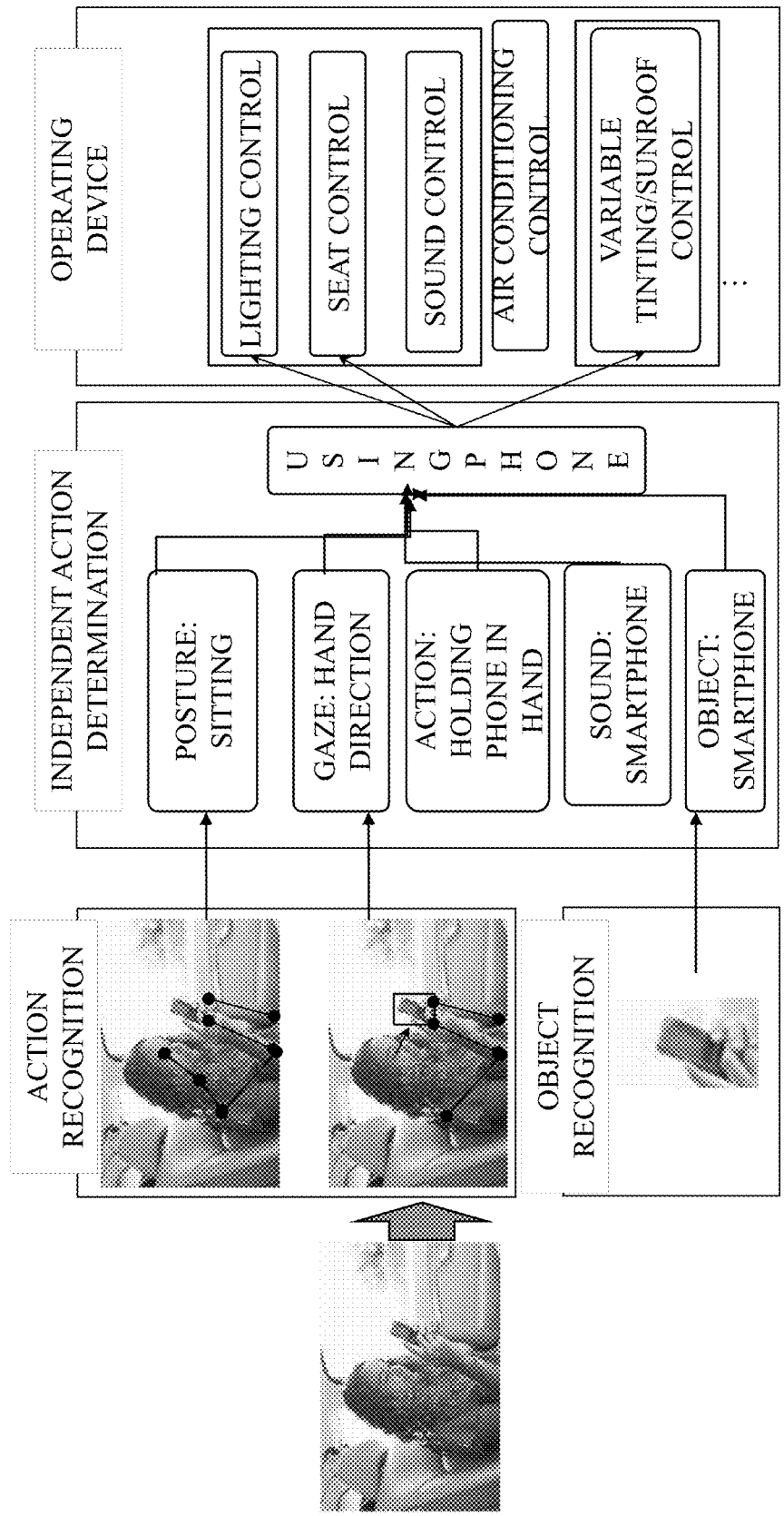
FIG. 6 is a diagram for illustrating an example of creating an in-cabin environment when a passenger is using a smartphone according to an embodiment of the present disclosure.

FIG. 6 is a diagram for illustrating an example of creating an in-cabin environment when a passenger is using a smartphone according to an embodiment of the present disclosure.

First, the video sensor may recognize the video of the passenger and the object possessed by the passenger in the scheme described above in relation to FIG. 3. An example in FIG. 6 illustrates a case in which the posture (sitting), the gaze (looking at the direction of the hand), and the action (holding the smartphone in the hand) of the passenger are determined as the plurality of determination target objects and the object possessed by the passenger is recognized as the smartphone.

Additionally, the microphone may be utilized as the auxiliary sensing means, and a sound based on an operation of the smartphone may be recognized.

The 'using the smartphone' may be determined as the independent action of the passenger based on the determination on the determination target objects as described above, and the in-cabin environment control may be performed accordingly. Specifically, in FIG. 6, the lighting may be brightly adjusted, the seat may be reclined as the relaxation mode, and the variable window tinting/sunroof may be adjusted to block the external light so as to prevent the glare of the passenger. When a sound of the smartphone is recognized, a sound reproduction volume of the vehicle may be reduced or muted.

Figure 7:
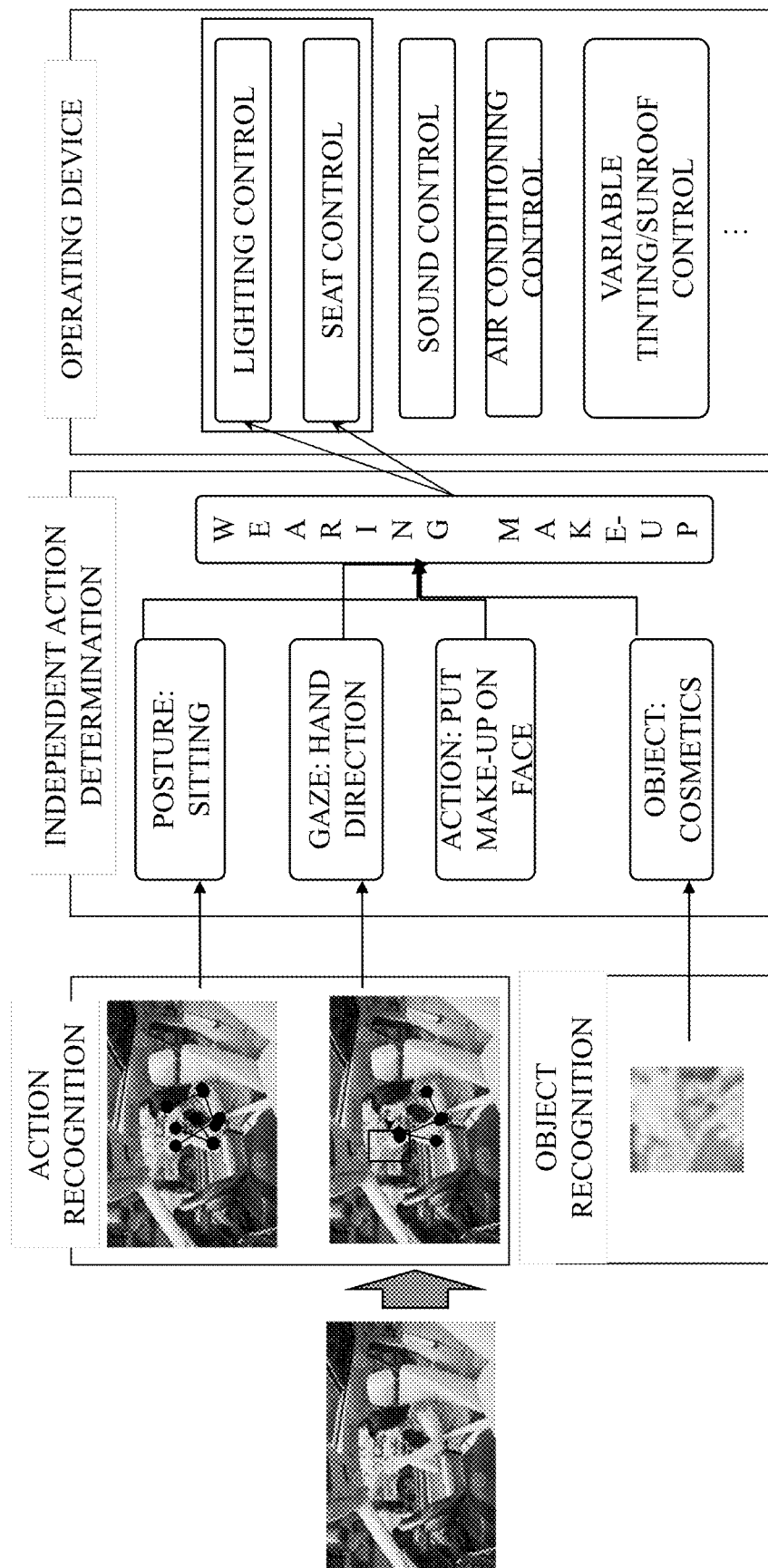
FIG. 7 is a diagram for illustrating an example of creating an in-cabin environment when a passenger is wearing a make-up according to an embodiment of the present disclosure.

FIG. 7 is a diagram for illustrating an example of creating an in-cabin environment when a passenger is wearing a make-up according to an embodiment of the present disclosure.

An example in FIG. 7 illustrates a case in which the posture (sitting), the gaze (looking at the direction of the hand), and the action (possessing cosmetics and approaching the face) of the passenger are determined as the plurality of determination target objects and the object possessed by the passenger is recognized as the cosmetics.

The 'wearing the make-up' may be determined as the independent action of the passenger based on the determination on the determination target objects as described above, and the in-cabin environment control may be performed accordingly. Specifically, in FIG. 7, the lighting may be brightly adjusted, a reclination angle of the seat may be reduced, and an odor of the cosmetics may be removed via an air conditioning system.

Figure 8:
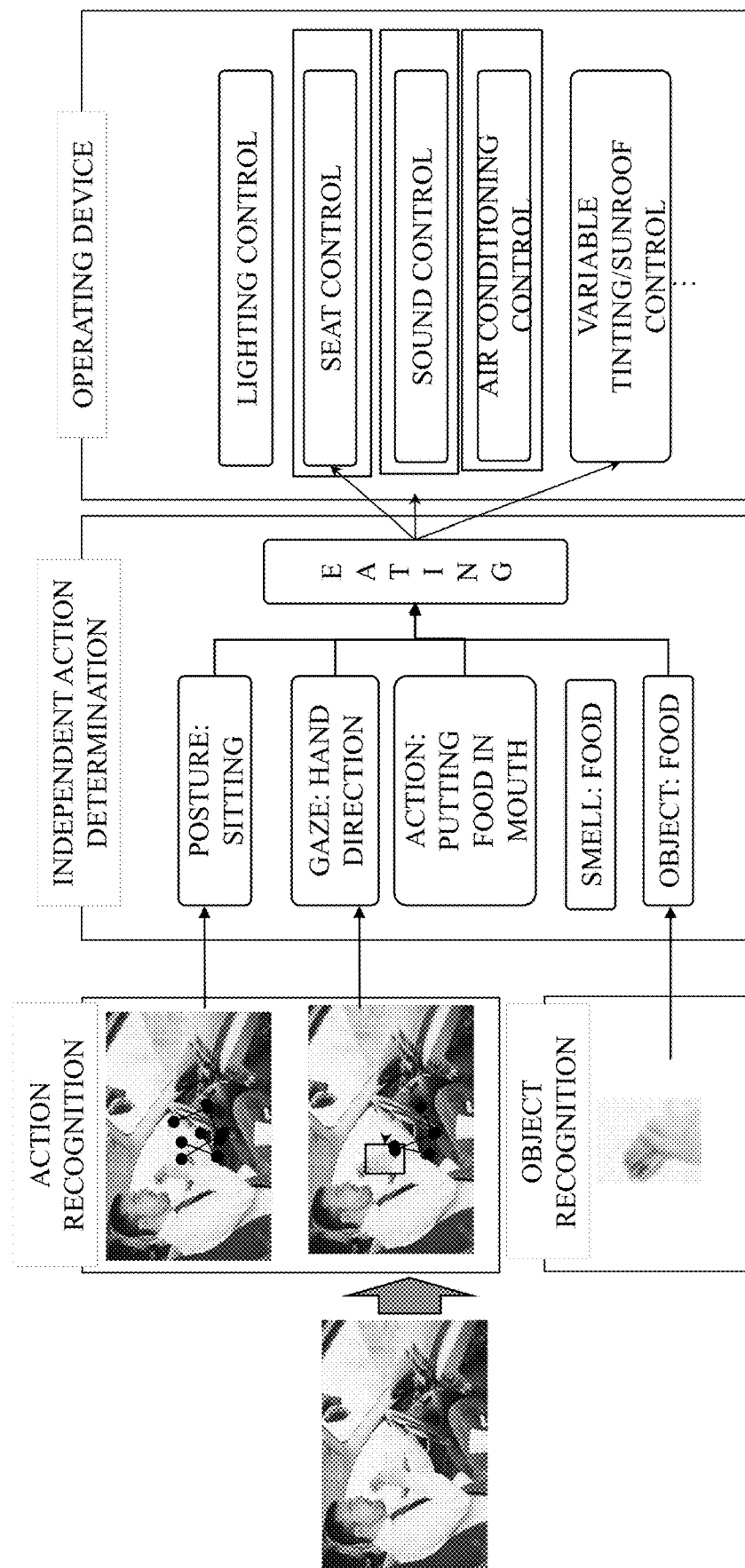
FIG. 8 is a diagram for illustrating an example of creating an in-cabin environment when a passenger is eating according to an embodiment of the present disclosure.

FIG. 8 is a diagram for illustrating an example of creating an in-cabin environment when a passenger is eating according to an embodiment of the present disclosure.

An example in FIG. 8 illustrates a case in which the posture (sitting), the gaze (looking at the direction of the hand), and the action (putting food in the mouth) of the passenger are determined as the plurality of determination target objects and the object possessed by the passenger is recognized as the food.

Additionally, smell of the food may be recognized using an olfactory sensor, which is the auxiliary sensing means.

The 'eating' may be determined as the independent action of the passenger based on the determination on the determination target objects as described above, and the in-cabin environment control may be performed accordingly. Specifically, in FIG. 8, the reclination angle of the seat may be reduced, the smell of the food may be removed via the air conditioning system, and a sound suitable for the eating may be reproduced.

Figure 9:
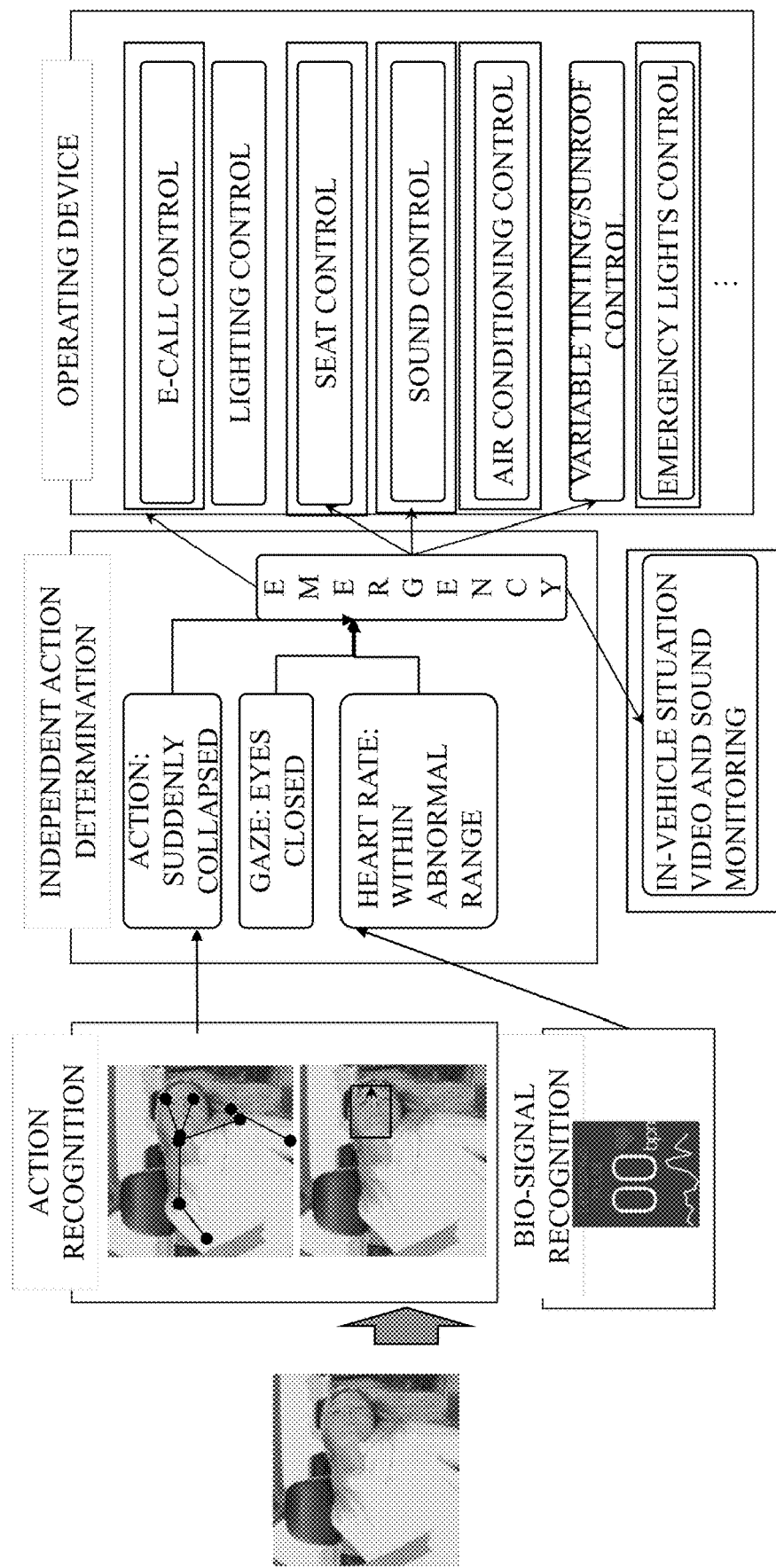
FIG. 9 is a diagram for illustrating an example of controlling an in-cabin environment when a passenger is in an emergency situation according to an embodiment of the present disclosure.

FIG. 9 is a diagram for illustrating an example of controlling an in-cabin environment when a passenger is in an emergency situation according to an embodiment of the present disclosure.

An example in FIG. 9 illustrates a case in which the action (suddenly collapsed), the gaze (closed eyes), and the like of the passenger are determined as the plurality of determination target objects. It may be determined that a heart rate of the passenger is in an abnormal range by the biometric sensor, which is the auxiliary sensing means.

The system according to the present embodiment may determine that the passenger is in an emergency situation based on such determination on the determination target objects, and may control the seat, the sound, the air conditioning, emergency lights, and the like to suit the emergency situation. In addition, the system may be set to notify an emergency center that the passenger is in the emergency situation via E-call control.

Figure 10:
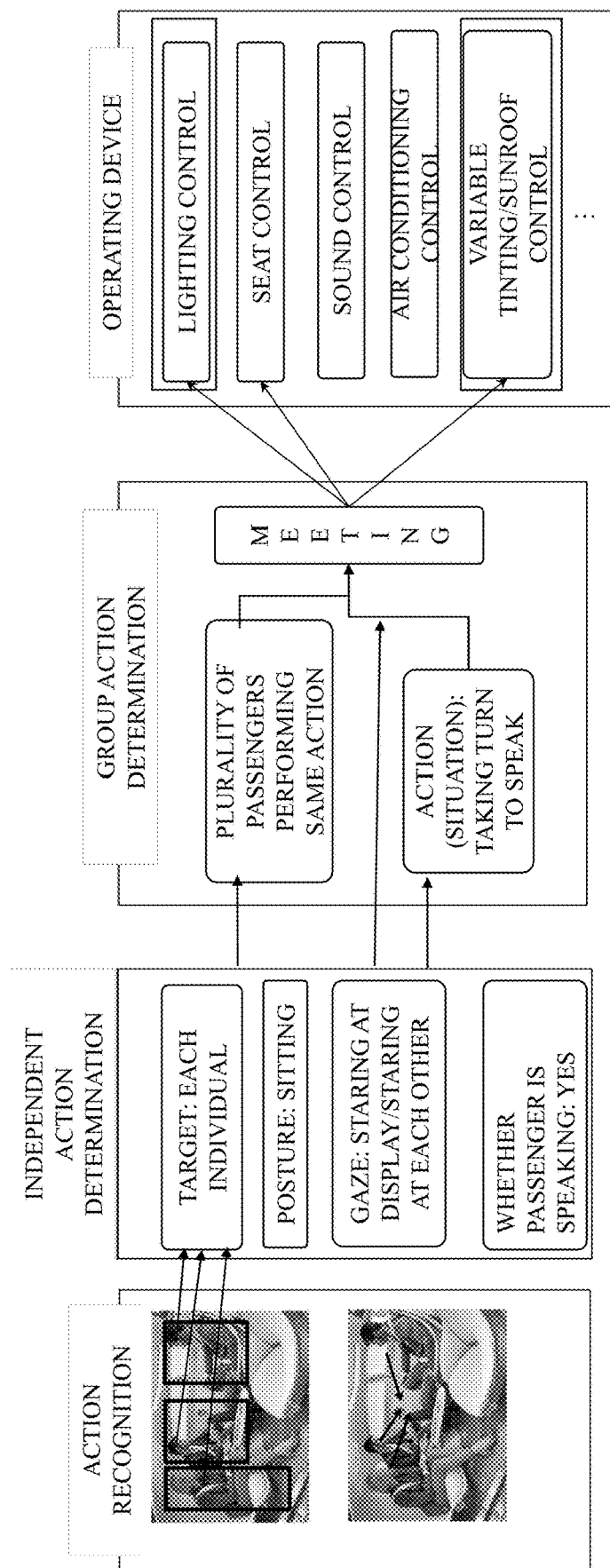
FIGS. 10 and 11 are diagrams for illustrating an example of controlling an in-cabin environment based on a situation of a plurality of passengers according to an embodiment of the present disclosure.
Figure 11:
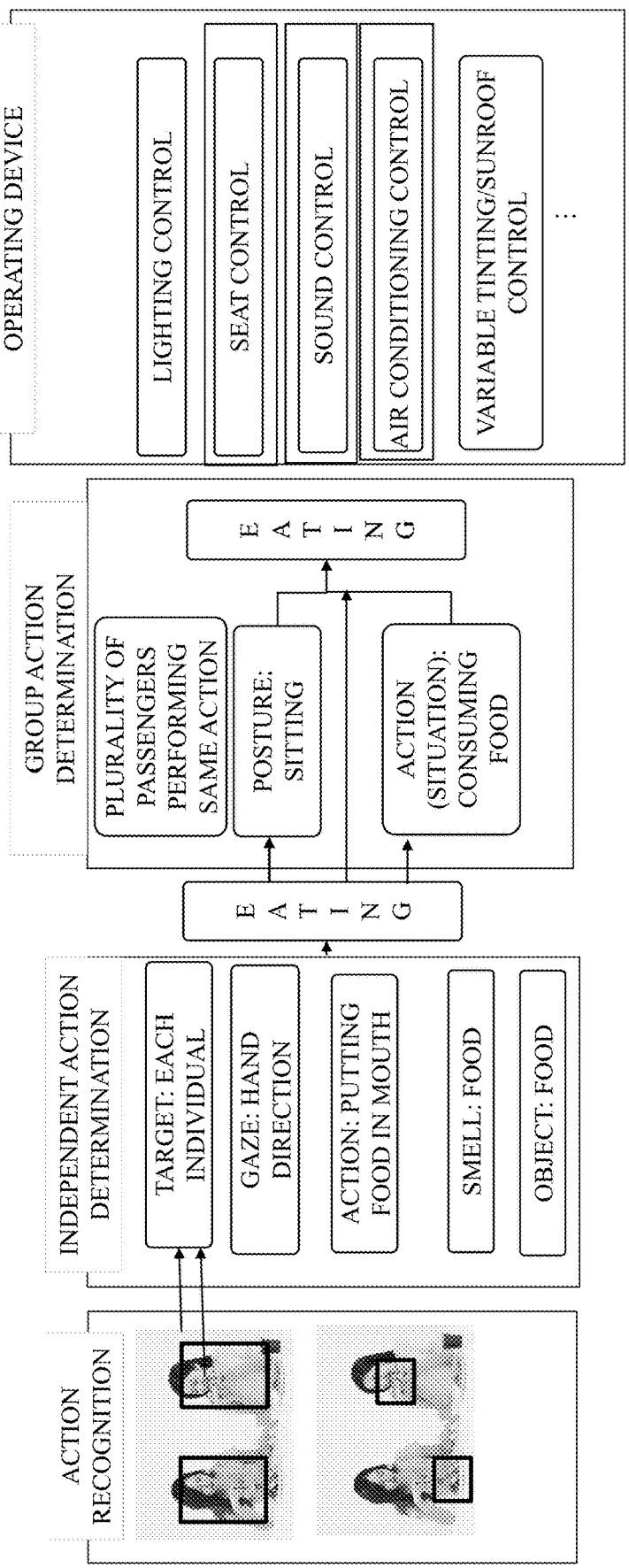

FIGS. 10 and 11 are diagrams for illustrating an example of controlling an in-cabin environment based on a situation of a plurality of passengers according to an embodiment of the present disclosure.

First, an example in FIG. 10 illustrates, as an example for the case in which the plurality of passengers are performing the business meeting, a case in which the posture (sitting) and the gaze (staring at a display/staring at each other) are recognized for each target as the single action of each of the plurality of passengers, and it is recognized that the passengers are speaking via the microphone one after another.

Via such recognition, the system according to the present embodiment may determine the business meeting as the group action, brightly adjust the lighting accordingly, and adjust the variable window tinting/sunroof to block the external light.

In addition, an example in FIG. 11 illustrates a case in which, as the determination for each passenger, the gaze is directed toward the hand, the action is consuming of the food, and it is recognized that the passengers have the food in common.

In this case, the system according to the present embodiment may determine the eating as the group action, and control the seat, the sound, and the air conditioning system.

Figure 12:
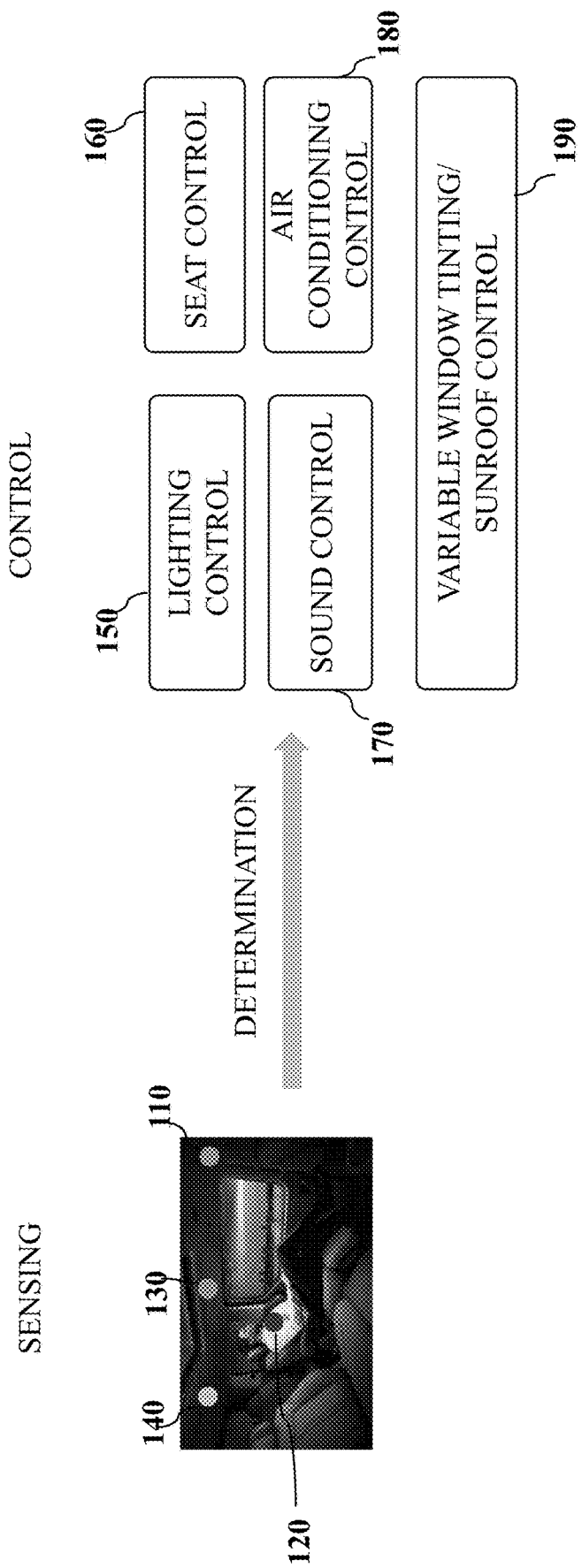
FIG. 12 is a diagram for illustrating a system for providing sleep care to a passenger according to an embodiment of the present disclosure.

FIG. 12 is a diagram for illustrating a system for providing sleep care to a passenger according to an embodiment of the present disclosure.

As shown in FIG. 12, sensors 110, 120, 130, and 140 for monitoring the state of the passenger may be equipped in order to provide sleep care to the passenger of the mobility device. Such sensors essentially include the video sensor 110, and it is assumed that the drowsing or sleeping state of the passenger is determined based on states of the face and the joints of the passenger by the video sensor 110.

That is, the video sensor 110 as the video sensor installed in the mobility device may be installed at a position where the passenger may be observed, may determine the action (e.g., the dozing and the sleeping) of the passenger via tracking of the face and the joints of the passenger, and may additionally measure the heart rate, a respiration rate, and the like.

Preferably, as shown in FIG. 12, the sensors may additionally include a bio sensor 120, an oxygen concentration sensor 130, and a sound sensor (a microphone) 140 as well as the video sensor 110.

Specifically, the bio sensor 120 may be divided into a first bio sensor having a wearable form that the passenger may wear and a second bio sensor having a form that may be installed in the mobility device, and may monitor electrocardiogram, an electroencephalogram signal, a body temperature, a blood oxygen saturation, and the like of the passenger to determine the sleeping state (e.g., a sleep stage, snoring, apnea, and the like).

In one example, the oxygen concentration sensor 13 may sense an oxygen concentration in the vehicle. Accordingly, as will be described below, the oxygen concentration sensor 13 may be used to control the air conditioning system associated thereto.

In addition, the sound sensor 140 may monitor noise (e.g., snoring, sleep talk, and the like) occurred during the sleep.

In the present embodiment, when it is determined that the passenger is in the drowsing or sleeping state based on the above-described sensor, it is proposed that the processor (not shown) may perform lighting control 150, seat control 160, sound control 170, air conditioning control 180, and variable window tinting/sunroof control 190 of the mobility device by being switched into a sleep mode. A more specific scheme will be described below.

Figure 13:
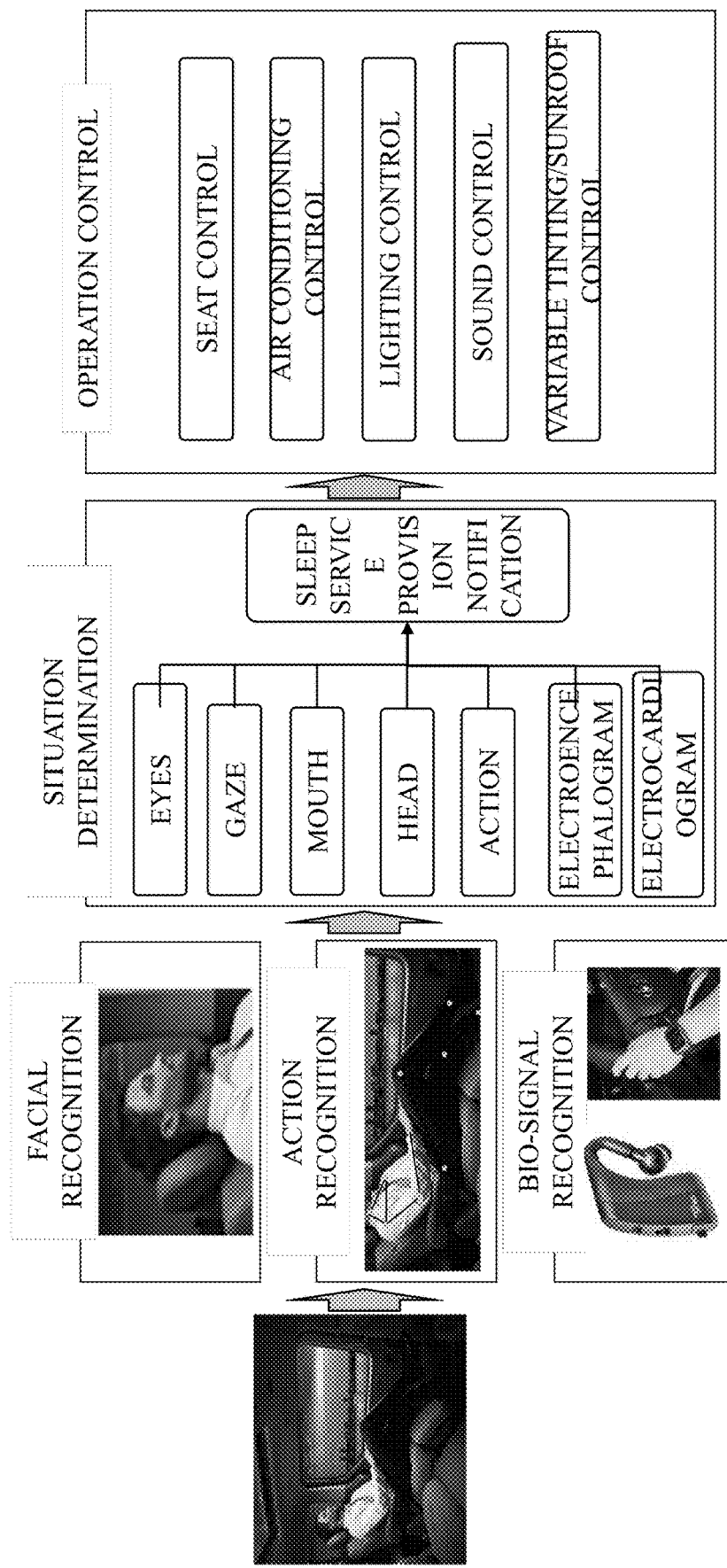
FIG. 13 is a diagram for illustrating a control scheme of a mobility device based on facial recognition, action recognition, and bio-signal recognition according to an embodiment of the present disclosure.

FIG. 13 is a diagram for illustrating a control scheme of a mobility device based on facial recognition, action recognition, and bio-signal recognition according to an embodiment of the present disclosure.

As shown in FIG. 13, facial recognition and action recognition of the passenger may be performed via the video sensor that may obtain the video of the passenger, and information such as the electroencephalogram, the electrocardiogram, and the like may be obtained via the first bio sensor that may be worn by the passenger and the second bio sensor mounted in the mobility device.

As in an example illustrated in FIG. 13, the first bio sensor may be in a form of a watch worn on a wrist of the passenger or in a form of an earphone worn in ears of the passenger, but the present disclosure may not be limited thereto. In addition, the second bio sensor may have a form such as an ECG sensor or the like mounted on a steering wheel for steering, but the present disclosure may not be limited thereto.

As shown in FIG. 13, situation determination may be performed based on the information obtained via the above-described sensors. Specifically, information on whether the passenger's eyes are closed or blinking frequently, whether the passenger is not able to keep the eyes on the road, whether the passenger frequently yawns, whether a passenger's head is tilted or the passenger is nodding, whether the passenger is motionless, and the like obtained via the video sensor may be considered to determine whether the passenger is drowsing or sleeping.

In addition, whether the passenger is drowsing or sleeping may be determined based on whether an alpha wave decreases and a theta wave increases in the electroencephalogram of the passenger and whether an RRI of the electrocardiogram of passenger increases as information obtained via the bio sensor.

When it is determined that the passenger is drowsing or in a sleeping state, as shown in FIG. 13, a notification for provision of a sleep service may be displayed. When the passenger does not deactivate/stop the notification within a predetermined time, the subsequent sleep care service may start, and the seat control, the air conditioning control, the lighting control, the sound control, the variable window tinting/sunroof control, and the like may be performed.

Figure 14:
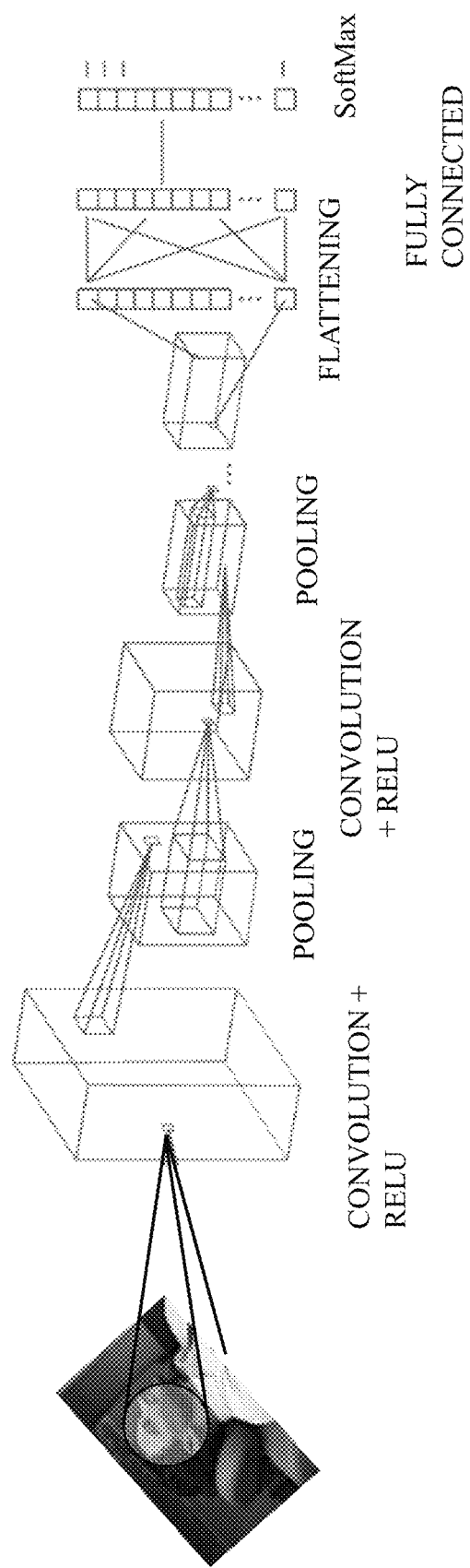
FIGS. 14 and 15 are diagrams for illustrating a method for determining a drowsing/sleeping state of a passenger in a deep learning scheme according to an embodiment of the present disclosure.
Figure 15:
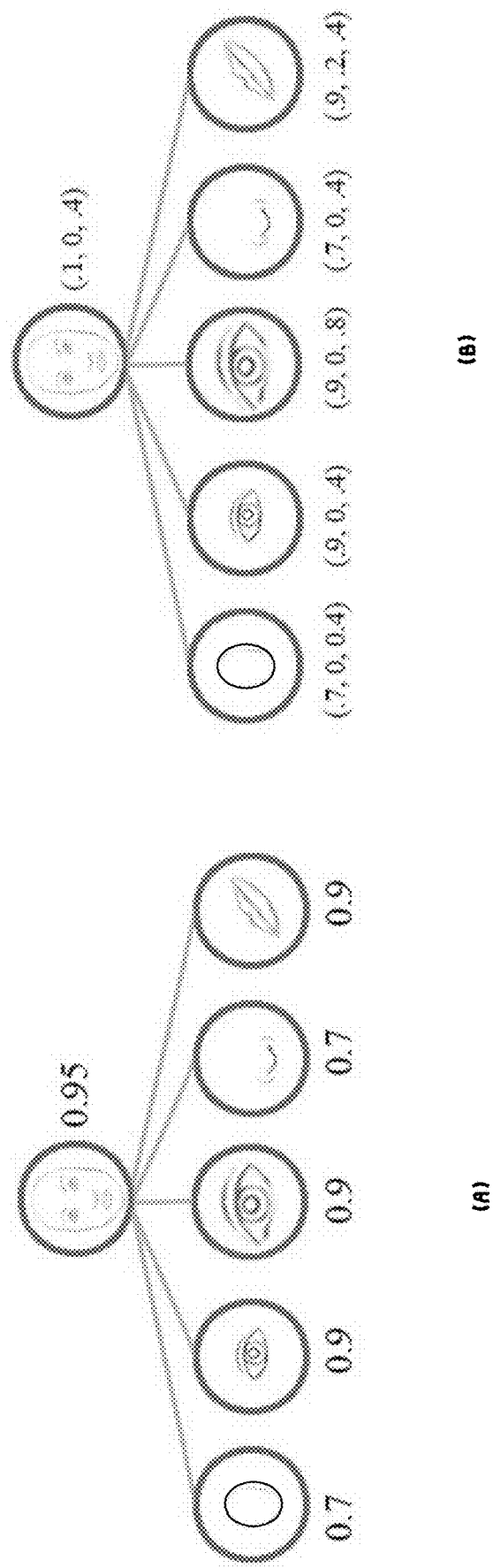

FIGS. 14 and 15 are diagrams for illustrating a method for determining a drowsing/sleeping state of a passenger in a deep learning scheme according to an embodiment of the present disclosure.

As shown in FIG. 15, the image of the passenger secured by the video sensor may be input as input data of the CNN. The CNN according to the present embodiment may include a plurality of convolution layers for extracting a feature map in the image of such input data first, and a pooling layer for performing sub-sampling between the plurality of convolution layers. As shown in FIG. 14, the convolution layers preferably activate only positive values in the corresponding feature map via a ReLU layer, but the present disclosure is not necessary to be limited thereto.

Feature vectors extracted as such may go through a process of flattening the three-dimensional image, the feature vectors may be output through a fully connected layer, and a task of classifying such feature vectors using softmax may be performed.

The feature vectors of the passenger image classified as such using the softmax may be compared with previously learned passenger state information stored in a server and used to determine the state of the passenger.

The image of the passenger used as the input data of the CNN as described above may be used as an image of entire face and joints of the passenger, but videos of eyes, mouth, head, and knees of the passenger may be used individually. In addition, the entire image of the passenger video and the individual images based on the video of the specific parts may also be utilized individually, and predetermined weights may be applied to such images to perform the determination. When the videos of the specific parts such as the eyes, the mouth, and the like are utilized from the video of the passenger, fragmentation/resizing and the like may be performed centering on a size of the image of the corresponding part, thereby increasing the accuracy of the determination.

In one example, FIG. 15 illustrates not only a scheme of determining the state of the passenger based on the individual determination of each feature (e.g., a face shape, the eyes, a nose, and the mouth) of the passenger's facial video (in (A) in FIG. 15) and the individual determination of each feature of the passenger's facial video, but also a scheme of vectorizing values based on a positional relationship, an arrangement, and the like of the features and considering all of those.

In a preferred embodiment of the present disclosure, in addition to the determination of the features of the passenger's facial and/or joint video, relationships in the entire video, such as the arrangement relationship therebetween may be additionally considered to determine the drowsing/sleeping state of the passenger.

Figure 16:
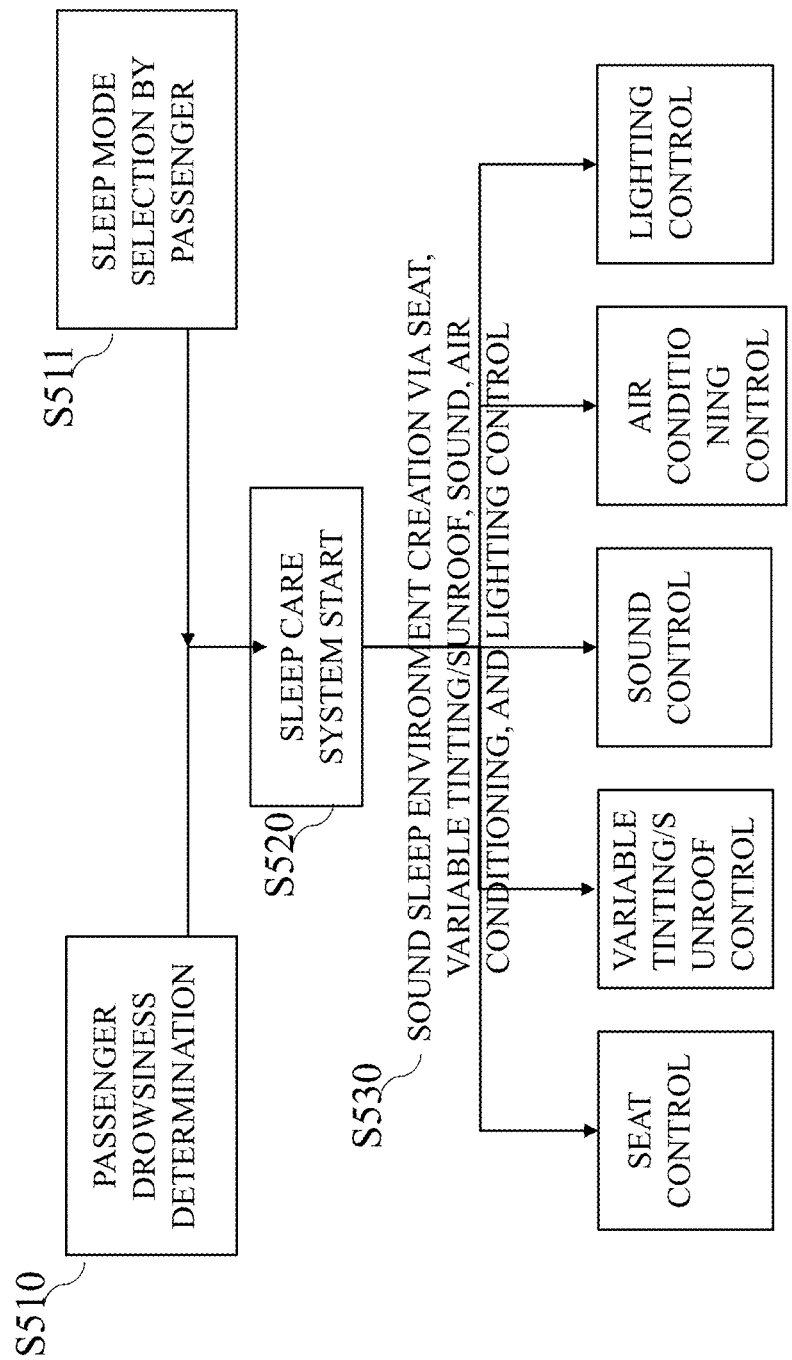
FIGS. 16 and 17 are diagrams for illustrating a method for performing sleep care of a mobility device based on determination on whether a passenger is in a drowsing/sleeping state according to an embodiment of the present disclosure.
Figure 17:
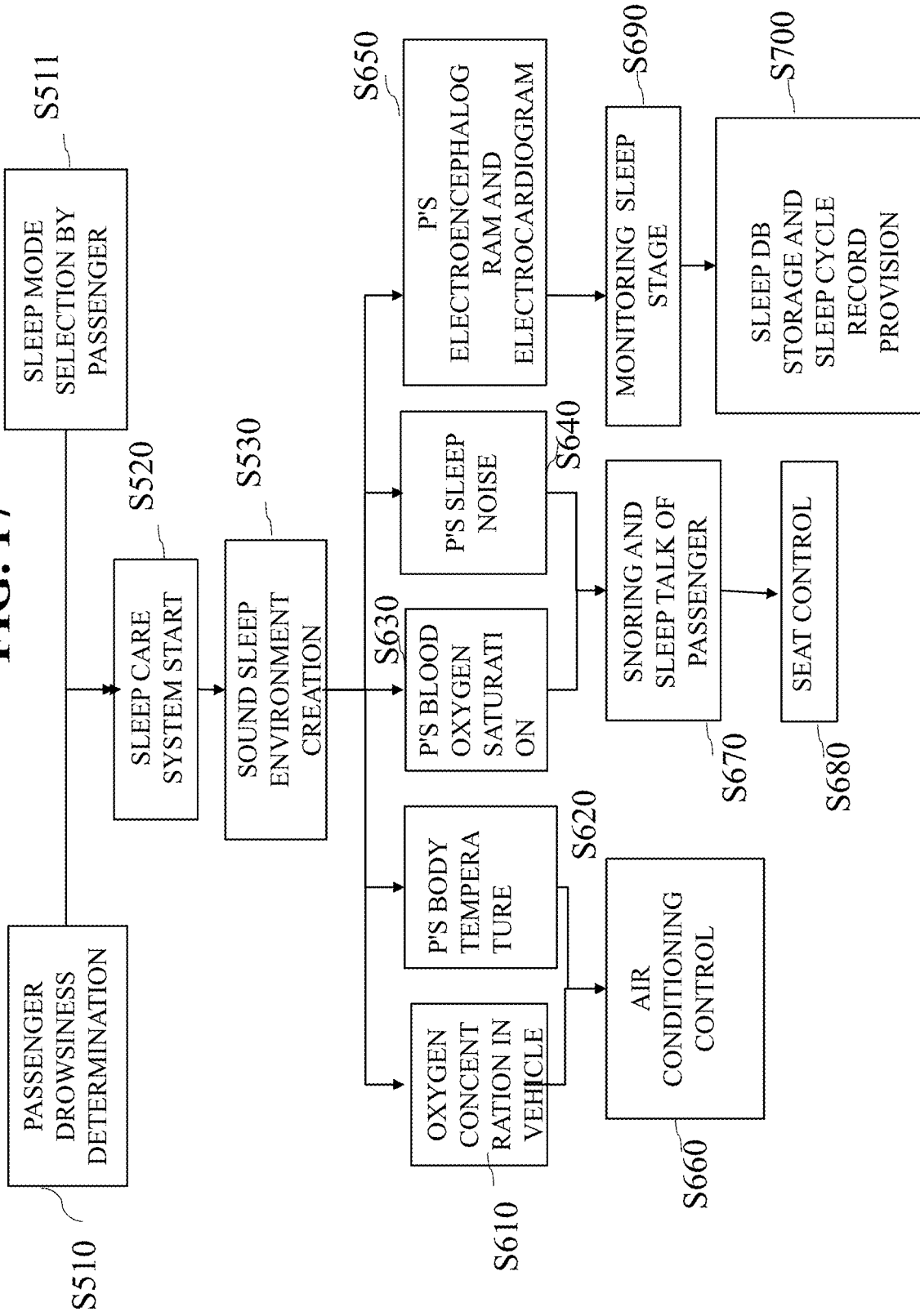

FIGS. 16 and 17 are diagrams for illustrating a method for performing sleep care of a mobility device based on determination on whether a passenger is in a drowsing/sleeping state according to an embodiment of the present disclosure.

In the present embodiment, a sleep care system equipped in the mobility device may monitor the drowsing/sleeping state of the passenger via the above-described video sensor and/or biometric sensor (S510). Separately, the passenger of the mobility device may manually select the sleep mode (S520). In response to such automatic determination/manual switching, the sleep care system according to the present embodiment may start the sleep care service suitable therefor (S520).

Basically, when the passenger selects the sleep mode (S520) or when the passenger's drowsiness is recognized via the video sensor and/or the biometric sensor in the mobility device, it is desirable to switch the mode of the mobility device to an autonomous driving mode. To this end, the system of the present embodiment may be set to output a message recommending to switch the mode to the autonomous driving mode on the display and switch the mode to the autonomous driving mode when the passenger does not deactivate/stop the message within a predetermined time.

In addition, in response to the activation of the sleep mode from the autonomous driving mode, a sound sleep may be induced via the seat control, the variable window tinting/sunroof control, the sound control (e.g., soundproof), the air conditioning control (e.g., dustproof), the lighting control, and the like (S530). In this regard, a strength of the seat, a temperature of the air conditioning, brightness of the lighting, and the like may be adjusted with user's feedback.

Specifically, the seat control may include an operation of changing a position of the seat to a comfortable position for the passenger to take a sound sleep (a relaxation mode) and adjusting a temperature of the seat. The variable window tinting/sunroof control may include an operation of adjusting a tinting blackout effect in order to prevent a sound sleep disturbance by external illuminance. The sound control may include an operation of canceling noise for blocking external noise and reproducing a sound that helps the sleep, such as pink noise. In addition, the air conditioning control may include an operation of adjusting the oxygen concentration in the vehicle via adjustment of an air conditioning intensity and external air circulation and adjusting an optimal air temperature. In addition, the lighting control may include an operation of adjusting brightness of an AVN and a cluster and using dark red lighting of a color temperature equal to or lower than 3000 K for the sound sleep.

In one example, during the sleep, the air conditioning system may be actively controlled via the monitoring of the passenger's body temperature and the oxygen concentration in the vehicle to maintain the optimal temperature and the oxygen concentration. In addition, when the snoring and the apnea are determined with the microphone (the sound sensor) and the biometric sensor, the snoring and the apnea may be alleviated via seat vibration and moving. In addition, the sleeping state may be recorded, so that information such as a sleep pattern, a habit, a state, a quality, and a duration may be provided to the passenger.

Specifically, as shown in FIG. 17, control of the oxygen concentration in the vehicle (S610) may be performed to identify whether the oxygen concentration falls to a level equal to or lower than 20% (a reference concentration) with the oxygen concentration sensor in the vehicle. Monitoring of the passenger's body temperature (S620) may be an operation of measuring the passenger's body temperature via the wearable bio sensor worn by the passenger and the in-vehicle bio sensor, or via an infrared camera.

Air conditioning control (S660) based on such monitoring may mean introduction of the external air for maintaining the oxygen concentration in the vehicle and adjustment of the air temperature for maintaining the passenger body temperature at the optimal temperature.

In one example, monitoring of a passenger's blood oxygen saturation (S630) shown in FIG. 17 may mean an operation of determining the apnea by measuring the blood oxygen saturation with the virtual sensors based on the wearable bio sensor worn by the passenger and the in-vehicle bio sensor, and/or the video sensor. In addition, monitoring of the passenger's sleep noise (S640) may be an operation of sensing the snoring and the sleep talk of the passenger with the sound sensor (the microphone) (S670).

Seat control (S680) based on such monitoring may be set to alleviate the snoring and the apnea by inducing a change in sleeping posture with the seat moving and vibration effects when determining the snoring and the apnea, and may be set to change the position of the seat to an initial position after the alleviation.

In one example, monitoring of the passenger's electroencephalogram and electrocardiogram (S650) shown in FIG. 17 means an operation of performing measurement of the electroencephalogram and the electrocardiogram during the sleep with the virtual sensors based on the wearable and in-vehicle bio sensors and/or the video sensor. Accordingly, monitoring of the sleep stage (S690) may be an operation of determining the sleep stage based on the electroencephalogram and the electrocardiogram, and recording a sleep cycle accordingly. Sleep DB storage and sleep cycle record provision (S700) performed while going through such processes may include an operation of providing the passenger with a sleep quality, a pattern, a habit, and the like based on a sleep stage ratio in the monitored sleep cycle.

In the description as described above, the 'passenger' is a concept collectively referring to all users on the mobility device and encompassing both the driver and the passenger. However, it may be desirable to apply the autonomous driving mode switching operation based on the sensing of the drowsiness/sleeping of the passenger in the case in which the sensed passenger is the driver, but the present disclosure may not be limited thereto.

The method and the device for providing the sleep care to the passenger of the mobility device according to embodiments of the present disclosure as described above may be utilized in various mobility devices that may provide the sensing and sleep modes of the passenger as well as in the vehicle.

According to the embodiments of the present disclosure as described above, the convenience and the accuracy of the recognition of the state of the passenger may be increased by recognizing the state of the passenger of the autonomous vehicle in the deep learning scheme of the video obtained via the video sensor, and the in-cabin environment in the corresponding vehicle may be automatically controlled by minimizing manual manipulation of the passenger.

That is, according to the above-described embodiments, a voice, a pre-defined environment control preset, or the like may be utilized to automatically determine the motion of the human and the interaction with the object via the video and perform customized control without the passenger having to giving a command them one by one, thereby maximizing convenience.

As a specific example, the autonomous vehicle capable of controlling the in-cabin environment such as optimized lighting, sound, seat, air conditioning, window (tinting/sunroof), and the like by automatically determining various situations that may occur within the autonomous driving environment, such as the sleeping, using the cell phone, the task/meeting, reading, video (movie) watching, wearing a make-up, eating, and the like of the passenger may be implemented.

In addition, big data of a usage pattern of the autonomous vehicle user may be obtained and stored and then automatically analyzed to be utilized as improvement data when developing the vehicle.

In addition, according to one embodiment of the present disclosure, not only the state of the single passenger but also the group state of the plurality of passengers may be determined to efficiently support the in-cabin environment based on the group state of the passengers.

In addition, according to the embodiments of the present disclosure as described above, the drowsing or sleeping state of the passenger may be automatically determined based on the facial and joint states of the passenger using the sensor(s) including the video sensor, and internal devices of the mobility device may be efficiently controlled.

In addition, the performance of the deep learning may be improved by determining the videos of the features of the face and the joint of the passenger based on the convolutional neural network (CNN) scheme and configuring the videos of the features of the face and the joint of the passenger to contain at least one of the eyes, the mouth, the head, and the knees of the passenger.

The input device, processing device, and output device in FIGS. 1-17 that perform the operations described in this application are implemented by hardware components configured to perform the operations described in this application that are performed by the hardware components.

Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-17 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method for automatically controlling an in-cabin environment for a passenger in an autonomous vehicle, the method comprising:
monitoring a state of the passenger via a video sensor;
determining whether the state of the passenger corresponds to one of preset states of a predetermined number; and
in response to the determined state corresponding to the one of the preset states, controlling the in-cabin environment for the passenger by adjusting any one or any combination of any two or more of a seat, an air conditioning system, a lighting system, a sound system, a variable window tinting, and a variable sunroof of the autonomous vehicle based on the determined state of the passenger,
wherein the determining of the state of the passenger comprises:
detecting a plurality of determination target objects from a video image generated by the video sensor;
cropping an image of each of the plurality of determination target objects in the video image; and
determining whether the state of the passenger corresponds to at least one of the preset states via combinations of feature vectors of each of the cropped images.

2. The method of claim 1, wherein the monitoring of the state of the passenger comprises:
individually monitoring states of a plurality of passengers.

3. The method of claim 2, wherein the determining of the state of the passenger further comprises:
determining, when the states of the plurality of passengers are individually monitored, whether independent states of the plurality of passengers correspond to the one of the preset states; and
determining whether the independent states of the plurality of passengers correspond to a common group state.

4. The method of claim 1, wherein the images of the plurality of determination target objects comprises any one or any combination of any two or more of an image of either one or both of:
a specific part of a face and joints of the passenger;
an image related to a gaze direction of the passenger;
an image about an identity of the passenger; and
an image of belongings of the passenger.

5. The method of claim 1, further comprising:
recognizing, by an auxiliary sensor,
wherein the auxiliary sensor comprises any one or any combination of any two or more of a biometric sensor recognizing a bio-signal of the passenger, an illuminance sensor sensing illuminance in the autonomous vehicle, and a microphone.

6. The method of claim 5, wherein the determining of the state of the passenger further comprises:
using information based on the auxiliary sensor.

7. The method of claim 1, further comprising:
controlling a mode of any one or any combination of any two or more of the seat, the air conditioning system, the lighting system, the sound system, the variable window tinting, and the variable sunroof to a sleep mode when it is determined that the state of the passenger is a drowsy or sleepy state,
wherein the drowsing or the sleeping state of the passenger is determined by the video sensor based on states of a face and joints of the passenger.

8. The method of claim 7,
wherein the video sensor determines features of the face and the joints of the passenger based on a convolutional neural network (CNN) scheme, and
wherein the videos of the features of the face and the joints of the passenger comprise a video of any one or any combination of any two or more of eyes, a mouth, a head, and knees of the passenger.

9. A system for an autonomous vehicle for automatically controlling an in-cabin environment for a passenger, the system comprising:
a video sensor configured to monitor a state of the passenger; and
a processor configured to:
determine whether the state of the passenger corresponds to one of preset states of a predetermined number; and
in response to the state of the passenger corresponding to at least one of the preset states, control the in-cabin environment of the autonomous vehicle for the passenger by adjusting any one or any combination of any two or more of a seat, an air conditioning system, a lighting system, a sound system, a variable window tinting, and a variable sunroof of the autonomous vehicle based on the determined state of the passenger,
wherein, the processor is further configured to:
detect a plurality of determination target objects from a video image generated by the video sensor;
crop an image of each of the plurality of determination target objects; and
determine whether the state of the passenger corresponds to at least one of the preset states via combinations of feature vectors of each of the cropped images.

10. The system of claim 9, wherein the video sensor individually monitors states of a plurality of passengers.

11. The system of claim 10, wherein the processor is further configured to:
determine whether independent states of the plurality of passengers correspond to the one of the preset states; and
determine whether the independent states correspond to a common group state.

12. The system of claim 9, wherein the images of the plurality of determination target objects comprise any one or any combination of any two or more of an image of either one or both of a specific part of a face and joints of the passenger, an image related to a gaze direction of the passenger, an image about an identity of the passenger, and an image of belongings of the passenger.

13. The system of claim 9, further comprising:
an auxiliary sensor comprising any one or any combination of any two or more of a biometric sensor configured to recognize a bio-signal of the passenger, an illuminance sensor configured to sense illuminance in the autonomous vehicle, and a microphone.

14. The system of claim 13, wherein the processor is further configured to further determine the state of the passenger using information based on the auxiliary sensor.

15. The system of claim 9, wherein the processor is further configured to:
control a mode of any one or any combination of any two or more of the seat, the air conditioning system, the lighting system, the sound system, the variable window tinting, and the variable sunroof to a sleep mode in response to a determination that the state of the passenger is a drowsy state or a sleepy state; and determine the drowsing or the sleeping state of the passenger based on states of a face and joints of the passenger.

16. The system of claim 9, further comprising a memory configured to store instructions;

wherein the processor is further configured to execute the instructions to configure the processor to detect the plurality of determination target objects, crop the image of the plurality of determination target objects, and determine whether the state of the passenger corresponds to the one of the preset states.

* * * * *